United States Patent
Clark et al.

(10) Patent No.: US 8,307,336 B1
(45) Date of Patent: Nov. 6, 2012

(54) MECHANISM FOR ENABLING A SET OF OUTPUT FROM A FUNCTIONAL COMPONENT TO BE PRESENTED ON DIFFERENT TYPES OF CLIENTS

(75) Inventors: James A. Clark, Sunnyvale, CA (US); Konstantin Krupnikov, Sunnyvale, CA (US); Jeffrey W. Allen, Denver, CO (US)

(73) Assignee: Oracle America, Inc., Redwood City, CA (US)

( * ) Notice: Subject to any disclaimer, the term of this patent is extended or adjusted under 35 U.S.C. 154(b) by 2271 days.

(21) Appl. No.: 11/095,831

(22) Filed: Mar. 30, 2005

(51) Int. Cl.
- G06F 9/44 (2006.01)
- G06F 3/00 (2006.01)
- G06F 3/048 (2006.01)

(52) U.S. Cl. ........ 717/113; 717/110; 715/760; 715/762; 715/763

(58) Field of Classification Search .......... 717/107–109, 717/120–121, 135–137, 105, 113, 125; 715/760, 715/762, 763
See application file for complete search history.

(56) References Cited

U.S. PATENT DOCUMENTS

| | | | | |
|---|---|---|---|---|
| 5,754,173 A * | 5/1998 | Hiura et al. | | 715/744 |
| 5,893,127 A * | 4/1999 | Tyan et al. | | 715/209 |
| 6,023,714 A * | 2/2000 | Hill et al. | | 715/235 |
| 6,370,681 B1 * | 4/2002 | Dellarocas et al. | | 717/110 |
| 6,556,219 B1 * | 4/2003 | Wugofski | | 715/762 |
| 6,708,074 B1 * | 3/2004 | Chi et al. | | 700/121 |
| 6,715,129 B1 * | 3/2004 | Hind et al. | | 715/239 |
| 6,907,572 B2 * | 6/2005 | Little et al. | | 715/762 |
| 6,990,654 B2 * | 1/2006 | Carroll, Jr. | | 717/109 |
| 7,017,145 B2 * | 3/2006 | Taylor | | 717/104 |
| 7,024,631 B1 * | 4/2006 | Hudson et al. | | 715/763 |
| 7,065,744 B2 * | 6/2006 | Barker et al. | | 717/109 |
| 7,103,874 B2 * | 9/2006 | McCollum et al. | | 717/121 |
| 7,114,148 B2 * | 9/2006 | Irving et al. | | 717/121 |
| 7,133,874 B2 * | 11/2006 | Hill et al. | | 707/102 |
| 7,188,335 B1 * | 3/2007 | Darr et al. | | 717/121 |
| 7,191,404 B2 * | 3/2007 | Barker et al. | | 715/760 |
| 7,222,334 B2 * | 5/2007 | Casati et al. | | 717/136 |
| 7,240,325 B2 * | 7/2007 | Keller | | 717/104 |
| 7,257,816 B2 * | 8/2007 | Kulp et al. | | 718/104 |
| 7,272,546 B1 * | 9/2007 | Brown et al. | | 703/13 |
| 7,302,462 B2 * | 11/2007 | Kulp et al. | | 709/202 |
| 2003/0135825 A1 * | 7/2003 | Gertner et al. | | 715/513 |
| 2004/0113938 A1 * | 6/2004 | Akerfeldt | | 345/738 |
| 2006/0025987 A1 * | 2/2006 | Baisley et al. | | 704/4 |
| 2006/0206808 A1 * | 9/2006 | Jasthi et al. | | 715/522 |

OTHER PUBLICATIONS

Pietriga et al., "VXT: A Visual Approach to XML Transformations," Nov. 2001, ACM, p. 1-10.*
Villard et al., "An Incremental XSLT Transformation Processor for XML Document Manipulation," May 2002, ACM, p. 474-485.*
Li et al., "Composing XSL Transformations with XML Publishing Views," Jun. 2003, ACM, p. 515-526.*
Leinonen, Paula, "Automating XML Document Structure Transformations," Nov. 2003, ACM, p. 26-28.*

* cited by examiner

*Primary Examiner* — Wei Zhen
*Assistant Examiner* — Qing Chen
(74) *Attorney, Agent, or Firm* — Osha Liang LLP

(57) ABSTRACT

An output processor for transforming the output produced by a functional component into different forms that can be consumed and presented by different types of clients is disclosed. With this output processor, a functional component is allowed to produce a single set of output that is not targeted at any particular type of client. The output processor then determines which type of client is requesting the output, and transforms the output into a form that can be consumed and presented by that type of client. By performing this transformation, the output processor allows the implementation of the functional component to be decoupled from the client that is requesting output from the functional component. This decoupling in turn enables the amount of effort needed to develop and maintain functional components in a large scale program to be significantly reduced.

18 Claims, 11 Drawing Sheets

```
<message resource-file=[file name] key=[key ID]>    —402
    <replacement-param> [value] </replacement-param>    —404
</message>    —406
```

*Fig. 4*

```
<message>    —502
    <text> [text of message] </text>    —504
</message>    —506
```

*Fig. 5*

```
<table>    —602
    <headers>    —604
        <header> [value] </header>    —606
        .
        .
        .
    </headers>    —608
    <rows>    —610
        <row>    —612
            <column> [value] </column>    —614
            .
            .
            .
        </row>    —616
        .
        .
    </rows>    —618
</table>    —620
```

*Fig. 6*

| Name | IP | State |
|------|-----|-------|
| foo | 192.168.0.1 | OK |
| bar | 192.168.0.32 | Failed |

*Fig. 7*

```
<table>
    <headers> ——802
        <header> Name </header> ——804
        <header> IP </header> ——806
        <header> State </header> ——808
    </headers> ——810
    <rows> ——812
        <row> ——814
            <column> foo </column> ——816
            <column> 192.168.0.1 </column> ——818
            <column> OK </column> ——820
        </row> ——822
        <row> ——824
            <column> bar </column> ——826
            <column> 192.168.0.32 </column> ——828
            <column> Failed </column> ——830
        </row> ——832
    </rows> ——834
</table>
```

*Fig. 8*

```
<table>
    <headers>
        <header>
            <message resource-file='MyResources'          902
                    key='server.name'/>
        </header>
        <header> IP </header>
        <header> State </header>
    </headers>
    <rows>
        <row>
            <column> foo </column>
            <column> 192.168.0.1 </column>
            <column> OK </column>
        </row>
        <row>
            <column> bar </column>
            <column> 192.168.0.32 </column>
            <column> Failed </column>
        </row>
    </rows>
</table>
```

*Fig. 9*

```
<property list>          1002
    <property>          1004
        <name> [value] </name>          1006
        <value> [value] </value>          1008
    </property>          1010
        .
        .
        .
</property list>          1012
```

*Fig. 10*

```
<property list>
    <property>  ─1102
        <name> Name </name>  ─1104
        <value> foo </value>  ─1106
    </property>  ─1108
    <property>  ─1110
        <name> IP </name>  ─1112
        <value> 192.168.0.1 </value>  ─1114
    </property>  ─1116
    <property>  ─1118
        <name> State </name>  ─1120
        <value> OK </value>  ─1122
    </property>  ─1124
</property list>
```

*Fig. 11*

```
<property list>
    <property>
        <name>
            <message resource-file='MyResources'
                    key='server.name'/>  ─1202
        </name>
        <value> foo </value>
    </property>
    <property>
        <name> IP </name>
        <value> 192.168.0.1 </value>
    </property>
    <property>
        <name> State </name>
        <value> OK </value>
    </property>
</property list>
```

*Fig. 12*

```
<result status='0'>         ⟵ 1302
    <deleted>               ⟵ 1304
        <name> foo </name>  ⟵ 1306
    </deleted>              ⟵ 1308
</result>                   ⟵ 1310
```

*Fig. 13*

```
<message resource-file='MyResources' key='deleted'>  ⟵ 1402
    <replacement-param> foo </replacement-param>     ⟵ 1404
</message>
```

*Fig. 14*

```
<message>
    <text> server foo deleted </text>
</message>
```

*Fig. 15*

```
<result status='0'>                   ⟵ 1602
    <servers>                         ⟵ 1604
        <server>                      ⟵ 1606
            <name> foo </name>        ⟵ 1608
            <IP> 192.168.0.1 </IP>    ⟵ 1610
            <state> OK </state>       ⟵ 1612
        </server>                     ⟵ 1614
        <server>                      ⟵ 1616
            <name> bar </name>        ⟵ 1618
            <IP> 192.168.0.32 </IP>   ⟵ 1620
            <state> Failed </state>   ⟵ 1622
        </server>                     ⟵ 1624
    </servers>                        ⟵ 1626
</result>                             ⟵ 1628
```

*Fig. 16*

```
<table>
    <headers>
        <header> Name </header>          ——1702
        <header> IP </header>            ——1704
        <header> State </header>         ——1706
    </headers>
    <rows>
        <row>
            <column> foo </column>           ——1708
            <column> 192.168.0.1 </column>   ——1710
            <column> OK </column>            ——1712
        </row>
        <row>
            <column> bar </column>           ——1714
            <column> 192.168.0.32 </column>  ——1716
            <column> Failed </column>        ——1718
        </row>
    </rows>
</table>
```

*Fig. 17*

```
<result status='0'>         ——1802
    <server>                ——1804
        <name> foo </name>           ——1806
        <IP> 192.168.0.1 </IP>       ——1808
        <state> OK </state>          ——1810
    </server>               ——1812
</result>                   ——1814
```

*Fig. 18*

```
<property list>
    <property>                    ─1902
        <name> Name </name>       ─1904
        <value> foo </value>      ─1906
    </property>                   ─1908
    <property>                    ─1910
        <name> IP </name>         ─1912
        <value> 192.168.0.1 </value>  ─1914
    </property>                   ─1916
    <property>                    ─1918
        <name> State </name>      ─1920
        <value> OK </value>       ─1922
    </property>                   ─1924
</property list>
```

*Fig. 19*

```
<result status='0'>
    <group>
        <name> Cluster 1 </name>
        <servers>                                             ─2002
            <security privilege='RestrictedServerRead'>
                <server>      ─2004
                    <name> foo </name>        ─2006
                    <IP> 192.168.0.1 </IP>    ─2008
                    <state> OK </state>       ─2010
                </server>    ─2012
            </security>    ─2014
            <security privilege='ServerRead'>    ─2016
                <server>    ─2018
                    <name> bar </name>         ─2020
                    <IP> 192.168.0.32 </IP>    ─2022
                    <state> Failed </state>    ─2024
                </server>    ─2026
            </security>    ─2028
        </servers>
    </group>
</result>
```

*Fig. 20*

MECHANISM FOR ENABLING A SET OF OUTPUT FROM A FUNCTIONAL COMPONENT TO BE PRESENTED ON DIFFERENT TYPES OF CLIENTS

BACKGROUND

Large scale computer programs comprise many functional components that generate information that is presented to a user. An example of such a component is a component that implements a command in a command line interface. When a user enters a command into a command line client to invoke the component, the component executes and produces a set of generated output. That generated output is then sent back to the command line client to be presented to the user.

Traditionally, the output that is generated by the component is in a form that is ready for consumption and presentation by the command line client. For example, if the generated information is to be presented to a user in a table format, then the output will already be arranged in table format. If the generated information is to be presented in a list format, then it will already be in a list format. In addition to setting forth the format, the output will also be of a type that is expected by the command line client. Typically, command line clients are text based; thus, the output of the component is usually in the form of text.

Having the component generate output that is ready for consumption and presentation by the client is fine when the output is consumed by only one type of client. However, in current large scale programs, the output from a functional component may be consumed by many different types of clients, which may include text-based clients, web-based clients, graphical user interface (GUI) clients, etc. To accommodate all of these different types of clients, significant code would have to be added to the functional component to enable it to generate all of these different types of outputs. This code would have to be added to every functional component (which could be very many in a large scale program) that produces output that is presented to a user. Furthermore, if another type of client is later added to a system, all of the functional components would have to be augmented to produce output that can be consumed by that type of client. Thus, as this discussion shows, the amount of development and maintenance effort could be immense. For at least these reasons, the approach of having the component generate output that is in a form that can be consumed and presented by a client is not practicable in many large scale programs.

SUMMARY

In accordance with one embodiment of the present invention, there is provided an output processor for transforming the output produced by a functional component into different forms that can be consumed and presented by different types of clients. With this output processor, a functional component is allowed to produce a single set of output that is not targeted at any particular type of client. The output processor then determines which type of client is requesting the output, and transforms the output into a form that can be consumed and presented by that type of client. By performing this transformation, the output processor allows the implementation of the functional component to be decoupled from the client that is requesting output from the functional component. Thus, the implementation of the functional component does not need to include any code for generating specific types of outputs for specific types of clients. That way, if any of the types of clients change, or if new types of clients are added, the implementation of the functional component does not have to change. Overall, this decoupling significantly reduces the amount of effort needed to develop and maintain the functional components in a large scale program.

In one embodiment, the output processor operates as follows. Initially, it receives a set of output from a functional component. The set of output is generated dynamically by the functional component as a result of execution, and includes "raw" information that does not set forth any presentation format for presenting the set of output to a user. In one embodiment, the set of output is expressed in extensible markup language (XML).

After receiving the set of output, the output processor transforms it into a set of generic formatted output. In one embodiment, the set of generic formatted output comprises selected information from the set of output, and includes formatting information that indicates a format for presenting the selected information to a user. For example, the formatting information may indicate that the information should be shown in the form of a table, as a list of name/value pairs, etc. In one embodiment, the set of generic formatted output is expressed in XML; thus, the formatting information may take the form of XML tags. At this point, the set of output has been formatted for presentation; however, it is not yet in a form that can be consumed and presented by any particular type of client.

To complete the transformation, the output processor transforms the set of generic formatted output into a set of customized formatted output that is customized for consumption by a particular type of client. The customized formatted output may take on one of many different forms (e.g. text, hypertext markup language (HTML), GUI widgets, etc.) depending on what form is desired by the client that caused the functional component to be executed. Once derived, the customized formatted output is sent to the client for consumption and presentation thereby to a user. In this manner, the "raw" output from the functional component is transformed into a form that can be consumed and presented by the client. The output processor can perform this transformation function to derive any type of output desired by any type of client. Thus, the output processor enables the "raw" output of the functional component to be consumed and presented by any type of client.

BRIEF DESCRIPTION OF THE DRAWINGS

FIG. 4 shows a set of XML tags and grammar for specifying a message, in accordance with one embodiment of the present invention.

FIG. 5 shows another set of XML tags and grammar for specifying a message, in accordance with one embodiment of the present invention.

FIG. 6 shows a set of XML tags and grammar for specifying a table, in accordance with one embodiment of the present invention.

FIG. 7 shows a sample table.

FIG. 8 shows a set of XML that may be used to specify the table of FIG. 7, in accordance with one embodiment of the present invention.

FIG. 9 shows another set of XML that may be used to specify the table of FIG. 7, in accordance with one embodiment of the present invention.

FIG. 10 shows a set of XML tags and grammar for specifying a list of name/value pairs, in accordance with one embodiment of the present invention.

FIG. 11 shows a set of XML that may be used to specify a sample list of name/value pairs, in accordance with one embodiment of the present invention.

FIG. 12 shows another set of XML that may be used to specify a sample list of name/value pairs, in accordance with one embodiment of the present invention.

FIG. 13 shows a sample set of "raw" output.

FIG. 14 shows a sample set of non-localized generic formatted output that may be produced from the sample set of "raw" output shown in FIG. 13.

FIG. 15 shows a sample set of localized generic formatted output that may be produced from the non-localized generic formatted output shown in FIG. 14.

FIG. 16 shows another sample set of "raw" output.

FIG. 17 shows a sample set of non-localized generic formatted output that may be produced from the sample set of "raw" output shown in FIG. 16.

FIG. 18 shows yet another sample set of "raw" output.

FIG. 19 shows a sample set of non-localized generic formatted output that may be produced from the sample set of "raw" output shown in FIG. 18.

FIG. 20 shows a sample set of "raw" output that comprises security information.

DETAILED DESCRIPTION OF EMBODIMENT(S)

System Overview

Figure 1:
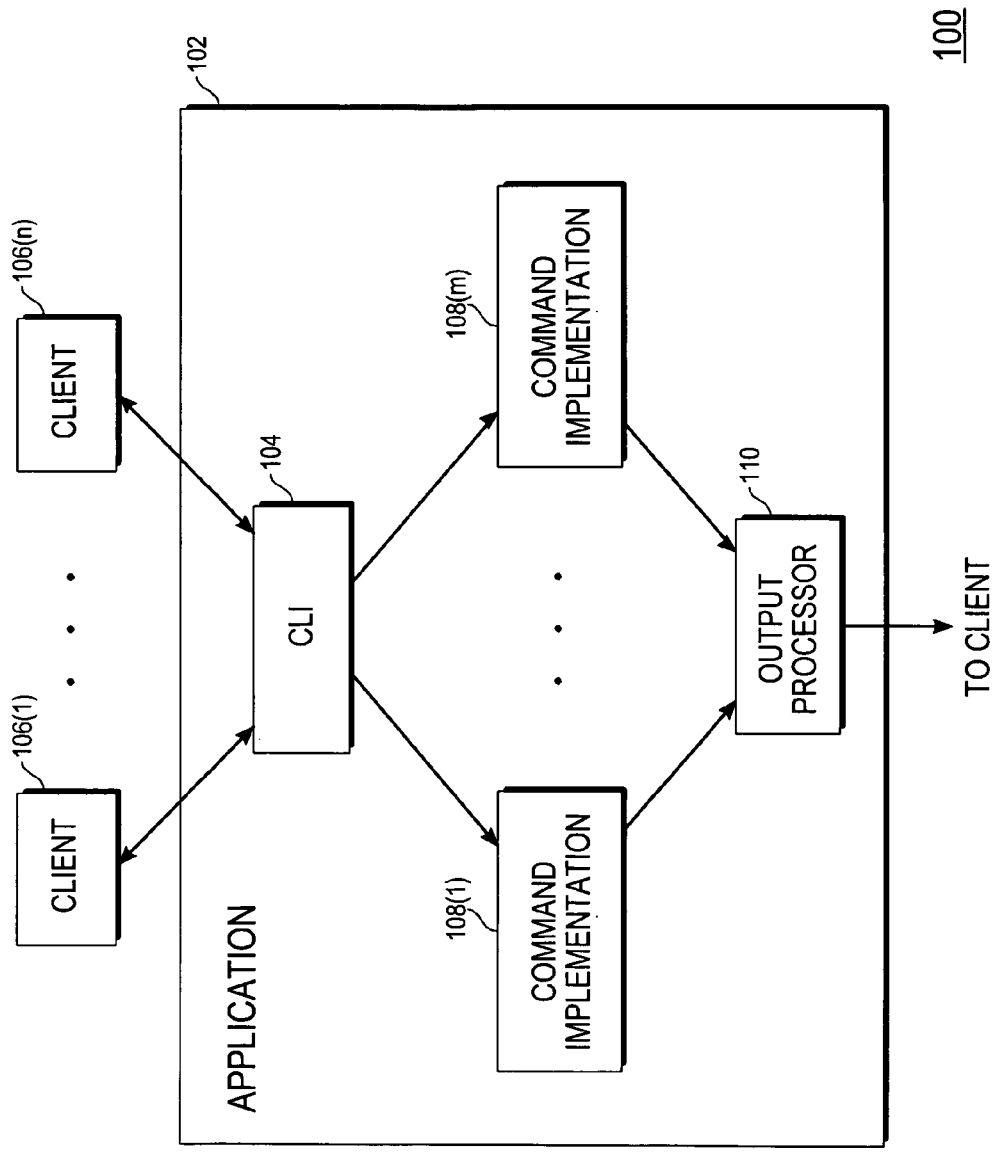
FIG. 1 is a functional block diagram of a system in which one embodiment of the present invention may be implemented.

With reference to FIG. 1, there is shown a functional block diagram of a system 100 in which one embodiment of the present invention may be implemented. In the following sections, the invention will be described in the context of functional components that implement commands in a command line interface. It should be noted though that this is for illustrative purposes only. The present invention is not limited to functional components that implement command line commands, but rather is generally applicable to any type of functional component. All applications of the concepts taught herein are within the scope of the present invention.

As shown in FIG. 1, system 100 comprises an application 102 and a plurality of command line clients 106. The application 102 provides a plurality of functionalities (e.g. commands) that can be invoked, and the clients 106 enable users to invoke those functionalities. In system 100, each of the clients 106 may be any type of client, including but not limited to a text-based client, a web-based client, a GUI client, etc.

The application 102 comprises a command line interface (CLI) 104, a plurality of command implementations 108, and an output processor 110. The command implementations 108 are the functional components that implement the various commands that can be invoked by the clients 106. For example, one of the command implementations 108 may implement a "show server" command that obtains information about one or more particular servers in a system. Another of the command implementations 108 may implement a "set server" command to set one or more parameters on a particular server in a system. These and other commands may be implemented by the command implementations 108.

The command implementations 108 may be invoked by the clients 106 via the CLI 104. More specifically, the CLI 104 interacts with the command line clients 106 to receive command lines. In response, the CLI 104 parses the command lines, determines the proper command implementations 108 to invoke, and invokes those command implementations 108. Overall, the CLI 104 coordinates and facilitates the command invocation process.

When invoked, a command implementation 108 performs one or more predetermined functions. The command implementation 108 may also dynamically generate some output that needs to be presented to the user that invoked the command implementation 108. For example, if the user invoked the "show server" command, the output may be the information obtained by the command implementation 108 for one or more servers.

As discussed previously, in prior approaches, the command implementation 108 would have provided this output in a form that could be consumed and presented by the particular client 106 that the user used to invoke the command implementation 108. In system 100, however, the command implementation 108 does not do this. Rather, it generates a set of "raw" output. This output is "raw" in the sense that: (1) it does not contain any information setting forth a presentation format for presenting the information to a user; and (2) it is not in a form that can be consumed and presented by a client 108 to a user. The "raw" output is provided to the output processor 110. When the output processor 110 receives this output, it determines which type of client (e.g. text-based, web-based, GUI, etc.) was used to invoke the command, and transforms the output into a form that that type of client can consume and present. For example, if the client 106 is a web-based client, then the output processor 110 may transform the output into HTML. The output processor 110 then sends the transformed output to the client 106 for presentation thereby to a user. By having the output processor 110 transform the output in this way, the command implementation 108 is relieved of having to generate different forms of output for different types of clients 106. Thus, if new types of clients 106 are added, or if the existing types of clients 106 are changed somehow, all that needs to be changed is some of the logic in the output processor 110. The command implementations 108 do not need to be changed (i.e. the "raw" output that they provide can remain the same). This makes development and maintenance of the command implementations 108 much simpler and more cost effective.

Output Processor Overview

Figure 2:
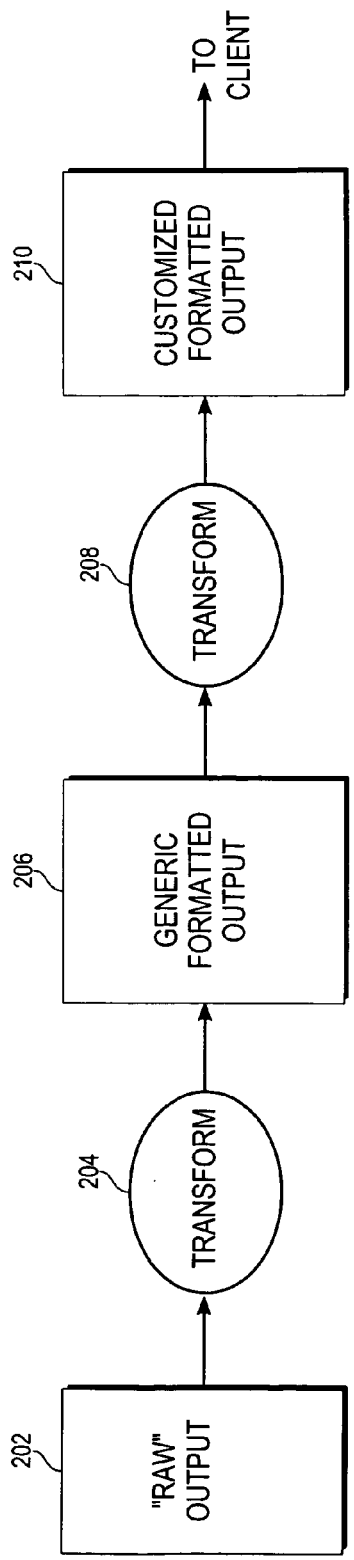
FIG. 2 shows a high level diagram of a transformation process carried out by the output processor of FIG. 1, in accordance with one embodiment of the present invention.

With reference to FIG. 2, there is shown a high level block diagram illustrating the transformation process carried out by the output processor 110 in accordance with one embodiment of the present invention. Initially, the output processor 110 receives a set of "raw" output 202 from one of the command implementations 108. In one embodiment, the "raw" output 202 is expressed in extensible markup language (XML). The "raw" output 202 comprises information dynamically generated by the command implementation 108, but does not comprise any information setting forth a presentation format for presenting the information in the output to a user. Thus, the XML tags in the "raw" output 202 describe what the information represents, but does not convey any information with regard to presentation format.

The output processor 110 transforms 204 the "raw" output 202 into a set of generic formatted output 206. In one embodiment, in doing so, the output processor 110 performs several functions. First, it selects certain information from the "raw" output 202. The underlying rationale for this selection is that not all of the information in the "raw" output 202 needs to be presented to a user. Thus, the output processor 110 selects only the information that needs to be presented.

After the information is selected, the output processor 110 adds formatting information to the selected information to indicate how the selected information is to be presented to a user. This formatting information may indicate, for example, that the selected information is to be presented as a table, or a list of name/value pairs, or in some other desired format. In one embodiment, the generic formatted output 206 is expressed in XML. Thus, the formatting information may take the form of one or more XML tags. This will be described in greater detail in a later section.

In addition to the two functions mentioned above, the output processor 110 may also perform a localization function as part of the transformation step 204. This localization function serves to translate some or all of the selected information into a language that is appropriate for a locale. For example, if the selected information includes the word "house", and if the user to whom the selected information is to be presented is in a locale that speaks Spanish, then "house" may be translated to "casa". These and other functions may be performed by the output processor 110 to transform the "raw" output 202 into the generic formatted output 206.

While the generic formatted output 206 comprises information indicating a presentation format, it is not yet in a form that any particular client can consume and present. To complete the transformation, the output processor 110 transforms 208 the generic formatted output 206 into a set of customized formatted output 210. The form that the customized formatted output 210 takes will depend upon the type of client 106. For example, if the client 106 to which the output is to be sent is a web-based client, then the form of the customized formatted output 210 may be HTML. On the other hand, if the client 106 is a text-based client, then the form of the customized formatted output 210 may be text. Once the output processor 110 derives the customized formatted output 210, it sends the output 210 to the client 106 to be consumed and presented thereby. In this manner, the output processor 110 transforms the "raw" output 202 into a form that a client 106 can use.

Output Processor Components

Figure 3:
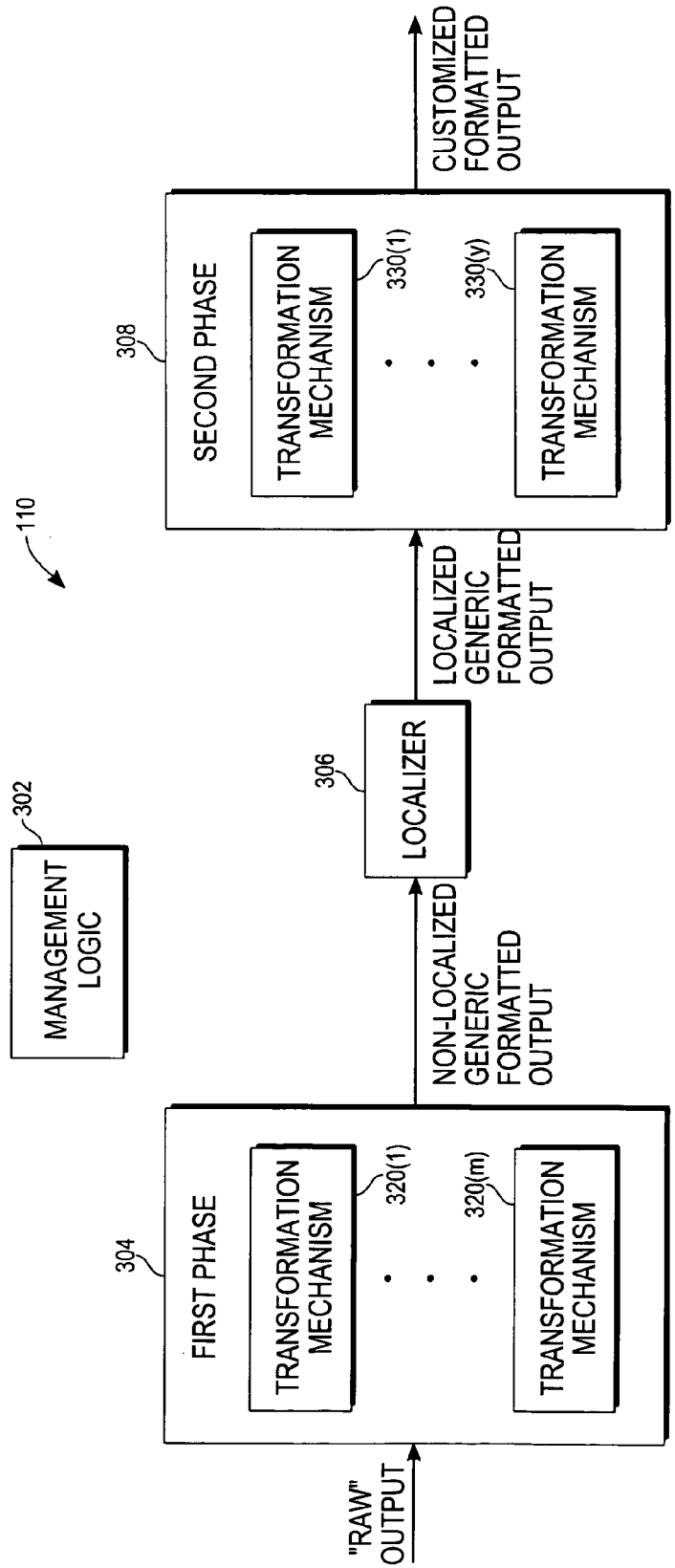
FIG. 3 is a functional block diagram of an embodiment of the output processor of FIG. 1.

FIG. 2 shows the transformation process carried out by the output processor 110. FIG. 3 shows a functional block diagram of the components within the output processor 110 that cooperate to carry out the transformation process, in accordance with one embodiment of the present invention. As shown in FIG. 3, the output processor 110 comprises a set of management logic 302, a set of first phase 304 transformation mechanisms 320, a localizer 306, and a set of second phase 308 transformation mechanisms 330. In this embodiment, the first phase 304 transformation mechanisms 320 and the localizer 306 carry out the first transformation step 204 shown in FIG. 2. The second phase 308 transformation mechanisms 330 carry out the second transformation step 208 shown in FIG. 2.

As shown in FIG. 3, the first phase 304 comprises a plurality of transformation mechanisms 320. In one embodiment, each transformation mechanism 320 in the first phase 304 is associated with a corresponding command implementation 108 (FIG. 1). For example, transformation mechanism 320(1) may be associated with command implementation 108(1), while transformation mechanism 320($m$) may be associated with command implementation 108($m$). Depending on which command implementation 108 is providing the "raw" output 202, the proper corresponding transformation mechanism 320 will be selected to process that output.

Each transformation mechanism 320 is customized to understand the "raw" output that is provided by its corresponding command implementation 108. For example, the transformation mechanism 320 knows what information to expect from its corresponding command implementation 108. The transformation mechanism 320 also knows what XML tags will be used in the "raw" output to describe the information contained therein. Furthermore, the transformation mechanism 320 knows what information should be selected from the "raw" output, and how that selected information should be formatted for presentation. Overall, each transformation mechanism 320 is customized with sufficient knowledge about its corresponding command implementation 108 that it can transform the "raw" output from that command implementation 108 into a set of non-localized generic formatted output.

The non-localized generic formatted output provided by a transformation mechanism 320 comprises the information that was selected from the "raw" output (this selected information is the information that should be presented to a user). The non-localized generic formatted output also comprises some formatting information indicating how the selected information is to be presented to a user. The formatting information may, for example, indicate that the information is to be presented in a table format, as a list of name/value pairs, or in some other desired format. In one embodiment, the non-localized generic formatted output is expressed in XML. Thus, the formatting information may take the form of XML tags. In one embodiment, all of the transformation mechanisms 320 use the same set of XML tags and the same XML grammar to produce the non-localized generic formatted output. Because a common set of tags and grammar are used by all of the transformation mechanisms 320, all of the non-localized generic formatted outputs produced by all of the transformation mechanisms 320 will be understood by any mechanism that understands the common set of tags and grammar. In this way, the formatted output is made "generic".

For purposes of the present invention, the transformation mechanisms 320 in the first phase 304 may be implemented in any desired way. For example, a transformation mechanism 320 may be implemented programmatically so that the transformation mechanism 320 is a functional component that can be invoked to transform an input XML document into an output XML document. A transformation mechanism 320 may also be implemented by way of an extensible stylesheet language transformation (XSLT) document and an XSLT transformer. In such an implementation, the XSLT document and the "raw" output (which is in the form of an XML document) are processed by the XSLT transformer to transform the "raw" output into the non-localized generic formatted output. A mix of these two implementations may also be used such that some of the transformation mechanisms 320 are implemented programmatically while others are implemented by way of XSLT documents. In one embodiment, for those command implementations 108 that can produce large amounts of output, the programmatic approach is used to implement the corresponding transformation mechanism 320. For the command implementations 108 that produce relatively small amounts of output, the XSLT approach is used to implement the corresponding transformation mechanism 320. The programmatic approach and the XSLT approach are just two of the possible ways of implementing the transformation mechanisms 320. Other implementation approaches may be used within the spirit of the present invention.

The generic formatted output from the first phase 304 is non-localized, meaning that the information in the generic formatted output has not yet been translated into a language that is proper for a particular locale. To localize the output, the localizer 306 is used. More specifically, a set of non-localized generic formatted output is fed to the localizer 306 from one of the transformation mechanisms 320 in the first phase 304. In response, the localizer 306 translates one or more portions of the information in the non-localized generic formatted output into a proper language for a particular locale to produce a set of localized generic formatted output. After this is done, the localized generic formatted output is presented by the localizer 306 to the second phase 308 for further transformation.

A purpose of the second phase 308 is to transform the localized generic formatted output into a form that can be consumed and presented by a particular type of client. Since multiple types of clients may consume the output, the second phase 308 comprises multiple transformation mechanisms 330. In one embodiment, each transformation mechanism 330 corresponds to a particular type of client. Put another way, each transformation mechanism 330 is capable of providing a particular type of output. For example, transformation mechanism 330(1) may correspond to a text-based type of client; thus, it transforms the localized generic formatted output into textual form (a form that a text-based client can consume and present to a user). Similarly, transformation mechanism 330(y) may correspond to a web-based type of client; thus, it transforms the localized generic formatted output into HTML (a form that a web-based client can consume and present to a user). These and other types of transformation mechanisms 330 may be included in the second phase 308 to enable the localized generic formatted output to be transformed into any desired form for consumption and presentation by any type of client. One of the advantages of having a transformation mechanism 330 for each type of client/output is that if another type of client requiring another type of output is to be accommodated at a later time, all that needs to be done is to add another transformation mechanism 330 (one that is capable of providing that type of output) to the second phase 308. The "raw" output and the localized generic formatted output do not have to be changed. Thus, the command implementations 108 and the transformation mechanisms 320 in the first phase 304 are not impacted.

In one embodiment, all of the transformation mechanisms 330 in the second phase 308 are customized to understand the XML tags and the XML grammar that are used in the generic formatted output. Thus, the same set of localized generic formatted output may be provided as input to any of the transformation mechanisms 330. Put another way, none of the transformation mechanisms 330 require the localized generic formatted output to be customized before the transformation mechanism 330 can use it as input.

For purposes of the present invention, the transformation mechanisms 330 in the second phase 308 may be implemented in any desired way. Like the transformation mechanisms 320 in the first phase 320, a transformation mechanism 330 in the second phase 308 may be implemented programmatically, by way of an XSLT document and an XSLT transformer, or in any other way. All possible implementations are within the scope of the present invention.

In one embodiment, the overall operation of the output processor 110 is managed by the management logic 320. It is the management logic 302 that interacts with the command implementations 108 to receive "raw" output therefrom. As part of this interaction, the management logic 302 receives from a command implementation 108: (a) a set of "raw" output generated by the command implementation 108; (2) some identification information that identifies the command implementation 108 providing the "raw" output; (3) an indication of which client 106 invoked the command implementation 108; (4) an indication of what type of transformed output (e.g. text, HTML, etc.) is desired by that client 106; and (5) an indication of a locale. Armed with this information, the management logic 302 constructs a pipeline of components to process the "raw" output.

Specifically, using the identification information, the management logic 302 determines which one of the transformation mechanisms 320 in the first phase 304 is associated with the command implementation 108 that is providing the "raw" output (recall from previous discussion that each transformation mechanism 320 is associated with a corresponding command implementation 108). The management logic 304 selects that transformation mechanism 320, and uses it to transform the "raw" output. More specifically, the management logic 304 provides the "raw" output to the transformation mechanism 320, and in response, the transformation mechanism 320 transforms the "raw" output into a set of non-localized generic formatted output.

After the non-localized generic formatted output is produced by the transformation mechanism 320, the management logic 302 feeds the non-localized generic formatted output to the localizer 306, along with an indication of a locale. In response, the localizer 306 translates none, a portion, or all of the information in the non-localized generic formatted output into a proper language for the locale to produce a set of localized generic formatted output.

Then, using the indication of the type of output desired, the management logic 302 selects a transformation mechanism 330 in the second phase 308 that produces the desired type of output. The management logic 302 thereafter uses the transformation mechanism 330 to derive a set of customized formatted output. More specifically, the management logic 302 feeds the localized generic formatted output to the selected transformation mechanism 330, and in response, the selected transformation mechanism 330 transforms the localized generic formatted output into a set of customized formatted output that is in a form that the client 106 can consume and present. Once the customized formatted output is produced, the management logic 302 sends it to the client 106 that invoked the command implementation 108. In this manner, the management logic 302 manages the flow of operation of the output processor 110.

XML Tags and Grammar Used in Generic Formatted Output

As noted previously, each of the transformation mechanisms 320 in the first phase 304 uses a common set of XML tags and grammar to produce the non-localized generic formatted output. These tags and grammar in effect form an intermediate XML language that is understood by the localizer 306 and the transformation mechanisms 330 in the second phase 308. To facilitate a complete understanding of the present invention, one possible version of this intermediate language will now be described. It should be noted that this version is shown for illustrative purposes only. It is not meant to be definitive or exhaustive. Many other versions may be used to achieve the same purposes.

It has been observed by Applicants that in a command line implementation context, the functional components (e.g. the command implementations 108) produce three main categories of outputs: (1) output that can be presented as a text message; (2) output that is best presented in the form of a table; and (3) output that is best presented in the form of a list of name/value pairs. In light of this observation, the intermediate language includes tags and grammar for accommodating each of these types of outputs.

Messages

A message is a set of text that provides some information to a user. In a command line context, a message usually tells a user whether a command succeeded or failed. If the command failed, a message may also comprise an error message.

One aspect that makes capturing a message somewhat complicated is that, if a message is to be presented to users in different locales, there may need to be different versions of the message. The substance of each version may be the same, but the form (e.g. the language) will be different. Because of this, a message often cannot be captured as just a static set of text but rather as a key. The key allows the proper version of the message to be dynamically determined, accessed, and used once the locale is known.

Another aspect of messages is that sometimes, they may need to incorporate information that is not known at the time the message is created. For example, the message "server [server name] deleted" needs a server name. That server name is not known until the command that generates the message is invoked. Thus, the name of the server cannot be statically included with the message but rather needs to be dynamically determined and inserted at the time the message is generated.

To accommodate both of these aspects of messages, the intermediate XML language provides the tags and grammar shown in FIG. 4. The "message" tags 402, 406 indicate that a message is being specified. The first "message" tag 402 allows a resource file and a key to be specified. The key is the value that will be used to access the message, and the resource file is the file that will be accessed to find the message using the key. In one embodiment, there is a resource file for each locale (a locale indicates a language), and that resource file contains messages for that locale. For example, the resource file "MyResources_en" may contain the messages in English, while the resource file "MyResources_ja" may contain the messages in Japanese. In one embodiment, the naming convention for the resource files is such that they all have the same basic name (e.g. "MyResources"). It is their extensions (e.g. "en") that indicate the locale (the language).

The resource files store the messages as key/value pairs. Thus, to obtain a message from a resource file, the key is used as a search parameter to find the corresponding key/value pair in the resource file. The value in the key/value pair will be the message. In one embodiment, the same key is used to search for a message regardless of the resource file. For example, if the key is "error1", that same key is used to search the "MyResource_en" or the "MyResources_ja" file. Thus, the key represents the particular message that is desired and the message obtained from a resource file represents a version of that message.

The "replacement-param" tag 404 allows a specified value to be inserted into a message. In the above example of "server [server name] deleted", the "replacement-param" tag allows a server name to be specified. Thus, if the name of the server is "foo", then the tag may look like:

<replacement-param> foo </replacement-param>.

When the message is generated, "foo" will be inserted into the message at a particular location.

To illustrate how the tags and grammar shown in FIG. 4 can be used, reference will now be made to an example. Suppose that the first "message" tag 402 in FIG. 4 specifies "MyResources" as the resource file and "deleted" as the key. Suppose further that the replacement parameter specified in the "replacement-param" tag 404 is "foo". Suppose further that the locale is one that speaks English. In this case, the localizer 306 (FIG. 3), based upon the locale, would append "_en" to the name of the resource file so that the name of the resource file would be "MyResources_en". This resource file would then be accessed, and the "deleted" key would be used to obtain a particular message therefrom. For the sake of example, suppose that the message is "server {0} deleted". In this message, the {0} acts as a marker to indicate where a replacement parameter should be inserted. Since the replacement parameter has been specified as "foo", and since it is now known where the replacement parameter should be inserted, the message "server foo deleted" can be formed. In this manner, the English version of the "deleted" message is obtained, and the replacement parameter is dynamically inserted into the message.

The tags and grammar shown in FIG. 4 are understood by the localizer 306. Specifically, it is the localizer 306 that uses the information in the tags to access the proper resource file, to access the proper message in the resource file, and to insert the replacement parameter into the message to form the final message. By the time the localizer 306 is through processing the message, a simple text message is derived. Because of this, in one embodiment, the transformation mechanisms 330 (FIG. 3) in the second phase 308 do not need to understand the tags and grammar shown in FIG. 4. Rather, they can understand the simpler tags and grammar shown in FIG. 5, which comprise "message" tags 502, 506 and a "text" tag 504. The "text" tag 504 allows the text of a message to be specified. The text in the "text" tag 504 may be generated by the localizer 306, for example, in the manner described above for the "server foo deleted" message. Given these tags, a transformation mechanism 330 can determine that a message is being specified, and what the text of that message is. As an alternative, the final text message derived by the localizer 306 may be passed to the transformation mechanisms 330 in plain text without the XML tags shown in FIG. 5. This and other variations are possible.

Tables

Some output from a functional component is best presented in a table format. To format the output from a functional component as a table, the tags and grammar shown in FIG. 6 may be used. As shown, the tags include a set of "table" tags 602, 620. These tags indicate that a table is being specified. Within the "table" tags is a set of "headers" tags 604, 608, and within the "headers" tags are one or more "header" tags 606. Each "header" tag 606 allows a value to be specified. Basically, this value represents the label or name assigned to one of the columns of the table. With multiple "header" tags 606, it is possible to specify the labels for all of the columns in the table.

Also contained within the "table" tags 602, 620 are a set of "rows" tags 610, 618. Within the "rows" tags 610, 618 are one or more sets of "row" tags 612, 616, and within the "row" tags 612, 616 are one or more "column" tags 614. Each column tag 614 allows a value to be specified. Basically, this value represents the value of one of the columns in one of the rows in the table. Within a set of "row" tags 612, 616, all of the values for all of the columns in that row can be specified. There can be one or more sets of "row" tags 612, 616; thus, within the "rows" tags 610, 618, the values for multiple rows can be specified.

To illustrate how these tags can be used to format a set of output into a table, reference will now be made to an example. FIG. 7 shows a table having a top row of column labels and two rows of data. FIG. 8 shows a set of XML that can be used to specify this table. As shown in FIG. 8, the names of the columns are specified in the "header" lines 804, 806, 808 which are contained within the "headers" tags 802, 810. The values of the first row are specified in the "column" lines 816, 818, 820, which are contained within the "row" tags 814, 822. Similarly, the values of the second row are specified in the "column" lines 826, 828, 830, which are within the "row" tags 824, 832. All of the "row" tags and "column" lines are within the "rows" tags 812, 834. Given the formatted information shown in FIG. 8, the table of FIG. 7 can be easily derived.

In some instances, it may be desirable to localize one or more sets of information in a table. For example, if a table has a "Name" label, it may be desirable to localize that label so that if the table is presented to a user in a locale that speaks English, the label is shown as "Name", but if the table is presented to a user in a locale that speaks Spanish, the label is shown as "Nombre". This localization can be done using the tags discussed previously in connection with messages. An example of this localization is shown in FIG. 9. Instead of setting forth a specific value ("Name") for the first column label, a message tag 902 is used to specify a resource file and a key. As explained previously, this allows the label for the column to be localized.

Name/Value Pairs

Some output from a functional component is best presented as a list of name/value pairs. This may be true, for example, for a command that returns a set of properties and their associated values to a user. To format the output from a functional component as a list of name/value pairs, the tags and grammar shown in FIG. 10 may be used. As shown, the tags include a set of "property list" tags 1002, 1012. These tags indicate that a list is being specified. Within the "property list" tags are one or more sets of "property" tags 1004, 1010. Within each set of "property" tags are a "name" tag 1006 and a "value" tag 1008. The "name" tag 1006 allows the name of a property to be specified. The "value" tag allows a value for that property to be specified. With multiple sets of "property" tags 1004, 1010, "name" tags 1006, and "value" tags 1008, it is possible to specify all of the name/value pairs in a list.

To illustrate how these tags can be used to format a set of output into a list, reference will now be made to an example. The following shows a sample list of name/value pairs:

Name: foo
IP: 192.168.0.1
State: OK.

FIG. 11 shows a set of XML that can be used to specify this list. As shown in FIG. 11, the name ("Name") and value ("foo") for the first name/value pair are specified in the "name" line 1104 and the "value" line 1106 between the "property" tags 1102, 1108. The name ("IP") and value ("192.168.0.1") for the second name/value pair are specified in the "name" line 1112 and the "value" line 1114 between the "property" tags 1110, 1116. Similarly, the name ("State") and value ("OK") for the third name/value pair are specified in the "name" line 1120 and the "value" line 1122 between the "property" tags 1118, 1124. Given the formatted information shown in FIG. 11, the list shown above can be easily derived.

In some instances, as was the case with a table, it may be desirable to localize one or more sets of information in a list. For example, for the property name "Name", it may be desirable to localize that name so that when the list is presented to a user in a locale that speaks English, the name is shown as "Name", but when the table is presented to a user in a locale that speaks Spanish, the name is shown as "Nombre". This localization can be done using the tags discussed previously in connection with messages. An example of this localization is shown in FIG. 12. Instead of setting forth a specific value ("Name") for "name" tag, a message tag 1202 is used to specify a resource file and a key. This allows the name of a property to be localized.

Sample Transformations

Now that a version of the intermediate XML language has been disclosed, some sample transformations will be described to facilitate a complete understanding of the present invention. It should be noted that the following sample transformations are shown for illustrative purposes only. They are not meant to be definitive or exhaustive. Many other transformations can be performed. All possible transformations are within the scope of the present invention.

Sample Transformation 1

Suppose that one of the clients 106 sends a command line "delete server foo" to the CLI 104 to delete a server named "foo" from a system. Suppose further that the client 106 is a web-based client, and that the user using the client 106 is in a locale that speaks English. When the CLI 104 receives this command line, it parses the command line, determines which command implementation 108 to invoke to execute the command in the command line, and invokes that command implementation 108. In doing so, the CLI 104 passes to the command implementation 108 the parameters of the command, a reference to the client, the type of the client, and the locale of the user.

In response to being invoked, the command implementation 108 executes the command to delete server "foo" from a system, and generates a set of "raw" output. Suppose that the "raw" output is that shown in FIG. 13. This "raw" output shows the result of the operation. Specifically, the "0" status in the "result" line 1302 indicates that the command succeeded. The "deleted" lines 1304, 1308 and the "name" line 1306 indicate that "foo" was deleted.

The command implementation 108 provides this "raw" output to the management logic 302 (FIG. 3) of the output processor 110. In addition, the command implementation 108 provides to the management logic 302: (a) some information identifying the command implementation 108; (b) a reference to the client 106; (c) an indication of the type of the client (which can be used to determine what type of final output is desired); and (d) the locale of the user.

With the information identifying the command implementation 108, the management logic 302 selects a transformation mechanism 320 in the first phase 304 that corresponds to that command implementation 108. The management logic 302 then passes the "raw" output and the locale information to the selected transformation mechanism 320.

Recall from previous discussion that the transformation mechanism 320 is customized for its corresponding command implementation 108. Thus, it knows what information to expect from the command implementation 108, what tags will be used to describe the information, what information should be selected for presentation to a user, and how the information is to be formatted. In this example, with this knowledge, the transformation mechanism 320 transforms the "raw" output into the non-localized generic formatted output shown in FIG. 14. As shown in FIG. 14, the non-localized generic formatted output takes the form of a message. From the "raw" output, the transformation mechanism 320 knows that a server named "foo" was deleted. Thus, it uses "deleted" as the message key in "message" line 1402, and it puts "foo" in a "replacement-param" line 1404. The transformation mechanism 320 also knows that the base name of the resource file that should be searched is "MyResources". Thus, it puts "MyResources" as the resource file name in "message" line 1402. The non-localized generic formatted output is thus produced by the transformation mechanism 320.

Thereafter, the management logic 302 feeds the non-localized generic formatted output to the localizer 306 for localization. In addition to the non-localized generic formatted output, the management logic 302 also provides to the localizer 306 an indication of the locale (in this example, the locale is one that speaks English). From the "message" line 1402, the localizer 306 knows that the base name of the resource file is "MyResources". From the locale, the localizer 306 knows that the extension should be "_en". Thus, the localizer 306 knows that the "MyResources_en" file should be accessed, and that the key "deleted" should be used to access a message from that file. In this manner, the localizer 306 obtains the "deleted" message from the "MyResources_en" file. Suppose that the message is "server {0} deleted". From the "replacement-param" line 1404, the localizer knows that "foo" should be inserted into the message. From the index {0} in the message, the localizer 306 knows where in the message to insert "foo". Thus, the localizer 306 is able to construct the message "server foo deleted". After it constructs the overall message, the localizer 306 puts it into a form that the transformation mechanisms 330 of the second phase 308 can understand. This form is shown in FIG. 15. In this manner, the localizer 306 produces the localized generic formatted output.

After the localized generic formatted output is produced, the management logic 302 selects one of the transformation mechanisms 330 in the second phase 308 to further transform the output into a form that the client 106 can consume and present to the user. The transformation mechanism 330 is selected based upon the client type (i.e. the type of output desired by the client 106). In the current example, the client 106 is a web-based client; thus, the management logic 302 selects the transformation mechanism 330 that produces HTML. The management logic 302 feeds the localized generic formatted output to the selected transformation mechanism 330, and in turn, the transformation mechanism 330 transforms the localized generic formatted output into a set of customized formatted output (HTML in this example). Once that is done, the management logic 302 sends the customized formatted output to the client 106, and the client renders the output to the user.

Sample Transformation 2

Suppose that one of the clients 106 sends a command line "show server" to the CLI 104 to obtain information about the servers in a system. Suppose further that the client 106 is a text-based client, and that the user using the client 106 is in a locale that speaks English. When the CLI 104 receives this command line, it parses the command line, determines which command implementation 108 to invoke to execute the command in the command line, and invokes that command implementation 108. In doing so, the CLI 104 passes to the command implementation 108 the parameters of the command, a reference to the client, the type of the client, and the locale of the user.

In response to being invoked, the command implementation 108 executes the command to obtain information about the servers in the system, and generates a set of "raw" output. Suppose that the "raw" output is that shown in FIG. 16. This "raw" output shows the result of the operation. Specifically, the "0" status in the "result" line 1602 indicates that the command succeeded. The successful execution of the command generated information for two servers. The information for the first server is provided between the first set of "server" tags 1606, 1614. The information for the second server is provided between the second set of "server" tags 1616, 1624. For each server, the name, the IP address, and the state of the server are provided (lines 1608, 1610, and 1612 for the first server, and lines 1618, 1620, and 1622 for the second server).

The command implementation 108 provides this "raw" output to the management logic 302 (FIG. 3) of the output processor 110. In addition, the command implementation provides to the management logic 302: (a) some information identifying the command implementation 108; (b) a reference to the client 106; (c) an indication of the type of the client (which can be used to determine what type of final output is desired); and (d) the locale of the user.

With the information identifying the command implementation 108, the management logic 302 selects a transformation mechanism 320 in the first phase 304 that corresponds to that command implementation 108. The management logic 302 then passes the "raw" output and the locale information to the selected transformation mechanism 320.

The selected transformation mechanism 320 is customized for its corresponding command implementation 108. Thus, it knows what information to expect from the command implementation 108, what tags will be used to describe the information, what information should be selected for presentation to a user, and how the information is to be formatted. In this example, the transformation mechanism 320 knows that the information should be formatted as a table; thus, it transforms the "raw" output into the non-localized generic formatted output shown in FIG. 17. As shown in FIG. 17, the output is formatted as a table. The "headers" 1702, 1704, 1706 of the table are taken from the names of the tags in lines 1608, 1610, 1612, 1618, 1620, 1622 of the "raw" output of FIG. 16. The "columns" 1708, 1710, 1712, 1714, 1716, 1718 are taken from the values specified in lines 1608, 1610, 1612, 1618, 1620, 1622 of the "raw" output. The non-localized generic formatted output is thus produced by the transformation mechanism 320.

Thereafter, the management logic 302 feeds the non-localized generic formatted output to the localizer 306 for localization. In this example, there is nothing in the non-localized generic formatted output that needs to be translated. Thus, the localizer 306 does not perform any localization. Hence, the localized generic formatted output is the same as the non-localized generic formatted output.

After the localized generic formatted output is derived, the management logic 302 selects one of the transformation mechanisms 330 in the second phase 308 to further transform the output into a form that the client 106 can consume and present to the user. The transformation mechanism 330 is selected based upon the client type (i.e. the type of output desired by the client 106). In the current example, the client 106 is a text-based client; thus, the management logic 302 selects the transformation mechanism 330 that produces text. The management logic 302 feeds the localized generic formatted output to the selected transformation mechanism 330, and in turn, the transformation mechanism 330 transforms the localized generic formatted output into a set of customized formatted output (text in this example). Once that is done, the management logic 302 sends the customized formatted output to the client 106, and the client renders the output to the user.

Sample Transformation 3

Suppose that one of the clients 106 sends a command line "show server foo" to the CLI 104 to obtain information about the server named "foo" in a system. Suppose further that the client 106 is a GUI client, and that the user using the client 106 is in a locale that speaks English. When the CLI 104 receives this command line, it parses the command line, determines which command implementation 108 to invoke to execute the command in the command line, and invokes that command implementation 108. In doing so, the CLI 104 passes to the command implementation 108 the parameters of the command, a reference to the client, the type of the client, and the locale of the user.

In response to being invoked, the command implementation 108 executes the command to obtain information about the server "foo", and generates a set of "raw" output. Suppose that the "raw" output is that shown in FIG. 18. This "raw" output shows, by the "0" status in "result" line 1802, that the command succeeded. The "raw" output also shows several properties for a server. Specifically, line 1806 shows that the name of the server is "foo". Line 1808 shows that the IP address of the server is "192.168.0.1", and line 1810 shows that the state of the server is "OK".

The command implementation 108 provides this "raw" output to the management logic 302 (FIG. 3) of the output processor 110. In addition, the command implementation provides to the management logic 302: (a) some information identifying the command implementation 108; (b) a reference to the client 106; (c) an indication of the type of the client (which can be used to determine what type of final output is desired); and (d) the locale of the user.

With the information identifying the command implementation 108, the management logic 302 selects a transformation mechanism 320 in the first phase 304 that corresponds to that command implementation 108. The management logic 302 then passes the "raw" output and the locale information to the selected transformation mechanism 320.

The selected transformation mechanism 320 is customized for its corresponding command implementation 108. Thus, it knows what information to expect from the command implementation 108, what tags will be used to describe the information, what information should be selected for presentation to a user, and how the information is to be formatted. In this example, the transformation mechanism 320 knows that the information should be formatted as a list of name/value pairs; thus, it transforms the "raw" output into the non-localized generic formatted output shown in FIG. 19. As shown in FIG. 19, the output is formatted as a list. The list has three sets of "property" tags (1902 and 1908, 1910 and 1916, 1918 and 1924). Within each set of "property" tags are a "name" tag and a "value" tag. The values in the "name" and "value" lines 1904, 1906 of FIG. 19 are taken from the information in line 1806 of FIG. 18. The values in the "name" and "value" lines 1912, 1914 of FIG. 19 are taken from the information in line 1808 of FIG. 18, and the values in the "name" and "value" lines 1920, 1922 of FIG. 19 are taken from the information in line 1810 of FIG. 18. The non-localized generic formatted output is thus produced by the transformation mechanism 320.

Thereafter, the management logic 302 feeds the non-localized generic formatted output to the localizer 306 for localization. In this example, there is nothing in the non-localized generic formatted output that needs to be translated. Thus, the localizer 306 does not perform any localization. Hence, the localized generic formatted output is the same as the non-localized generic formatted output.

After the localized generic formatted output is derived, the management logic 302 selects one of the transformation mechanisms 330 in the second phase 308 to further transform the output into a form that the client 106 can consume and present to the user. The transformation mechanism 330 is selected based upon the client type (i.e. the type of output desired by the client 106). In the current example, the client 106 is a GUI client; thus, the management logic 302 selects the transformation mechanism 330 that produces GUI components. The management logic 302 feeds the localized generic formatted output to the selected transformation mechanism 330, and in turn, the transformation mechanism 330 transforms the localized generic formatted output into a set of customized formatted output (GUI component in this example). Once that is done, the management logic 302 sends the customized formatted output to the client 106, and the client renders the output to the user.

Security Filtering

Thus far, the management logic 302 has been described as receiving the "raw" output from a command implementation 108, and providing it to a transformation mechanism 320 without further processing. This may be fine for some implementations, but in other implementations, it may be desirable for the management logic 302 or some other filtering mechanism to filter the information in the "raw" output before providing it to a transformation mechanism 320. This may be done for security reasons, for example. More specifically, the "raw" output may comprise some information that should not be presented to a user. In such a case, the information should be filtered out of the "raw" output before the "raw" output is provided to a transformation mechanism 320.

To illustrate how this may be done in accordance with one embodiment of the present invention, reference will be made to the sample "raw" output shown in FIG. 20. This set of "raw" output comprises two sets of "security" tags: (1) 2002 and 2014; and (2) 2016 and 2028. The first set of security tags 2002, 2014 specifies a "RestrictedServerRead" privilege, and the second set of security tags 2016, 2028 specifies a "ServerRead" privilege. With these specified privileges, a user should not be allowed to see the information between security tags 2002 and 2014 unless he/she has the "ServerMonitor" privilege. Likewise, the user should not be allowed to see the information between security tags 2016 and 2028 unless he/she has the "ServerRead" privilege.

In one embodiment, to enable the management logic 302 to properly filter the "raw" output, some additional information is provided to the management logic 302. This additional information includes information indicating one or more privileges held by a user. This privilege information may be provided by a client 106 and then passed from the CLI 104, to the command implementation 108, to the management logic 302. Given this privilege information, the management logic 302 (or some filtering mechanism invoked by the management logic 302) can properly filter the "raw" output. For example, if the user has only the "ServerRead" privilege and not the "RestrictedServerRead" privilege, then lines 2002 through 2014 would be filtered (i.e. removed) from the "raw" output before the "raw" output is provided to a transformation mechanism 320. Likewise, if the user has only the "RestrictedServerRead" privilege and not the "ServerRead" privilege, then lines 2016 through 2028 would be filtered from the "raw" output before it is provided to a transformation mechanism 320. In this way, secured information in the "raw" output can be properly protected.

Hardware Overview

Figure 21:
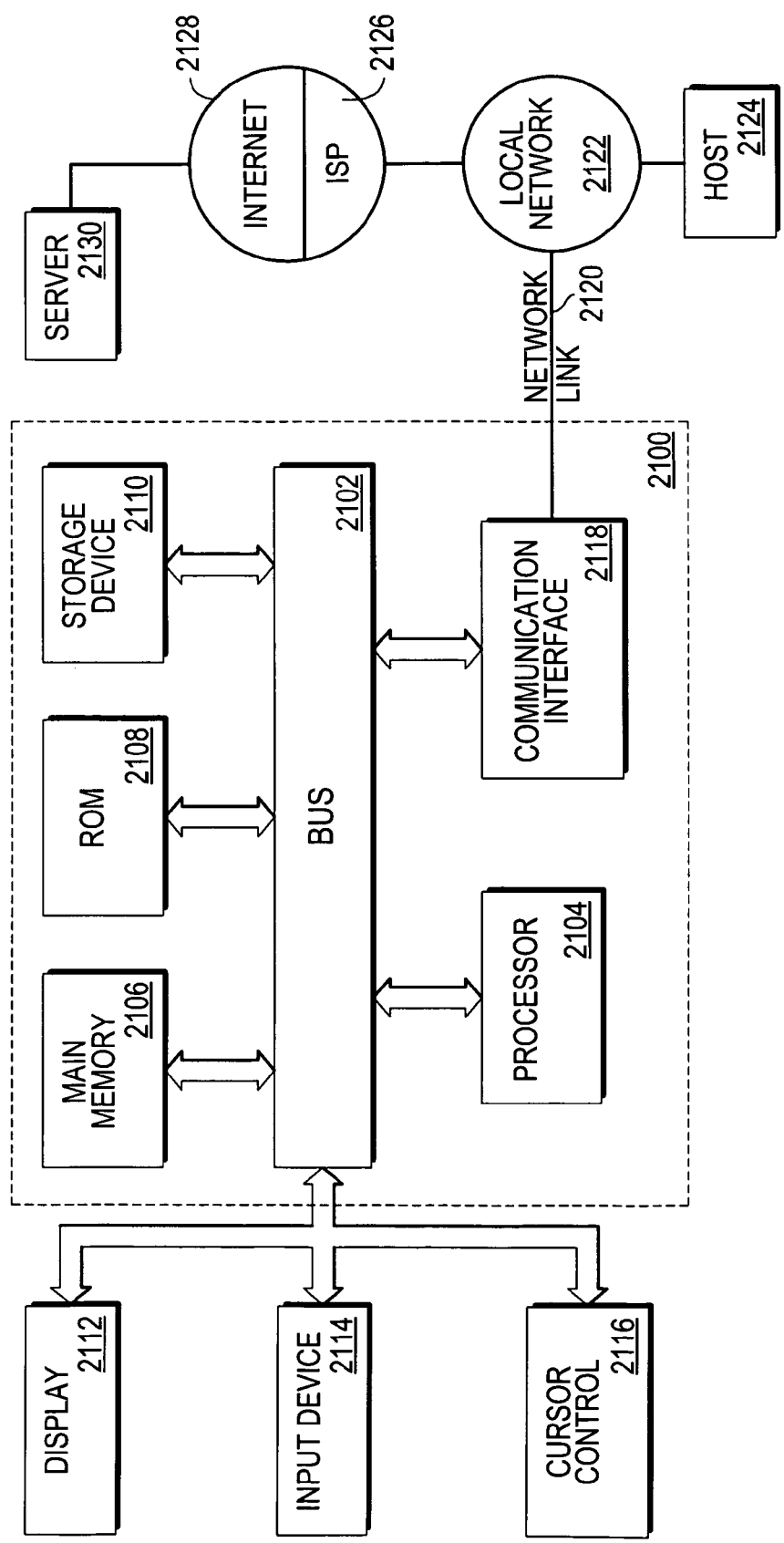
FIG. 21 is a block diagram of a general purpose computer system in which one embodiment of the present invention may be implemented.

In one embodiment, the components (e.g. application 102, CLI 104, clients 106, command implementations 108, output processor 110, management logic 302, transformation mechanisms 320, 330, localizer 306, etc.) discussed above are implemented as one or more sets of executable instructions. FIG. 21 is a block diagram that illustrates a computer system 2100 upon which one or more of these components may be executed. Computer system 2100 includes a bus 2102 for facilitating information exchange, and one or more processors 2104 coupled with bus 2102 for processing information. Computer system 2100 also includes a main memory 2106, such as a random access memory (RAM) or other dynamic storage device, coupled to bus 2102 for storing information and instructions to be executed by processor 2104. Main memory 2106 also may be used for storing temporary variables or other intermediate information during execution of instructions by processor 2104. Computer system 2100 may further include a read only memory (ROM) 2108 or other static storage device coupled to bus 2102 for storing static information and instructions for processor 2104. A storage device 2110, such as a magnetic disk or optical disk, is provided and coupled to bus 2102 for storing information and instructions.

Computer system 2100 may be coupled via bus 2102 to a display 2112 for displaying information to a computer user. An input device 2114, including alphanumeric and other keys, is coupled to bus 2102 for communicating information and command selections to processor 2104. Another type of user input device is cursor control 2116, such as a mouse, a trackball, or cursor direction keys for communicating direction information and command selections to processor 2104 and for controlling cursor movement on display 2112. This input device typically has two degrees of freedom in two axes, a first axis (e.g., x) and a second axis (e.g., y), that allows the device to specify positions in a plane.

In computer system 2100, bus 2102 may be any mechanism and/or medium that enables information, signals, data, etc., to be exchanged between the various components. For example, bus 2102 may be a set of conductors that carries electrical signals. Bus 2102 may also be a wireless medium (e.g. air) that carries wireless signals between one or more of the components. Bus 2102 may further be a network connection that connects one or more of the components. Any mechanism and/or medium that enables information, signals, data, etc., to be exchanged between the various components may be used as bus 2102.

Bus 2102 may also be a combination of these mechanisms/media. For example, processor 2104 may communicate with storage device 2110 wirelessly. In such a case, the bus 2102, from the standpoint of processor 2104 and storage device 2110, would be a wireless medium, such as air. Further, processor 2104 may communicate with ROM 2108 capacitively. Further, processor 2104 may communicate with main memory 2106 via a network connection. In this case, the bus 2102 would be the network connection. Further, processor 2104 may communicate with display 2112 via a set of conductors. In this instance, the bus 2102 would be the set of conductors. Thus, depending upon how the various components communicate with each other, bus 2102 may take on different forms. Bus 2102, as shown in FIG. 21, functionally represents all of the mechanisms and/or media that enable information, signals, data, etc., to be exchanged between the various components.

The invention is related to the use of computer system 2100 for implementing the techniques described herein. According to one embodiment of the invention, those techniques are performed by computer system 2100 in response to processor 2104 executing one or more sequences of one or more instructions contained in main memory 2106. Such instructions may be read into main memory 2106 from another machine-readable medium, such as storage device 2110. Execution of the sequences of instructions contained in main memory 2106 causes processor 2104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 2100, various machine-readable media are involved, for example, in providing instructions to processor 2104 for execution. Such a medium may take many forms, including but not limited to, non-volatile media, volatile media, and transmission media. Non-volatile media includes, for example, optical or magnetic disks, such as storage device 2110. Volatile media includes dynamic memory, such as main memory 2106. Transmission media includes coaxial cables, copper wire and fiber optics, including the wires that comprise bus 2102. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 2104 for execution. For example, the instructions may initially be carried on a magnetic disk of a remote computer. The remote computer can load the instructions into its dynamic memory and send the instructions over a telephone line using a modem. A modem local to computer system 2100 can receive the data on the telephone line and use an infra-red transmitter to convert the data to an infra-red signal. An infra-red detector can receive the data carried in the infra-red signal and appropriate circuitry can place the data on bus 2102. Bus 2102 carries the data to main memory 2106, from which processor 2104 retrieves and executes the instructions. The instructions received by main memory 2106 may optionally be stored on storage device 2110 either before or after execution by processor 2104.

Computer system 2100 also includes a communication interface 2118 coupled to bus 2102. Communication interface 2118 provides a two-way data communication coupling to a network link 2120 that is connected to a local network 2122. For example, communication interface 2118 may be an integrated services digital network (ISDN) card or a modem to provide a data communication connection to a corresponding type of telephone line. As another example, communication interface 2118 may be a local area network (LAN) card to provide a data communication connection to a compatible LAN. Wireless links may also be implemented. In any such implementation, communication interface 2118 sends and receives electrical, electromagnetic or optical signals that carry digital data streams representing various types of information.

Network link 2120 typically provides data communication through one or more networks to other data devices. For example, network link 2120 may provide a connection through local network 2122 to a host computer 2124 or to data equipment operated by an Internet Service Provider (ISP) 2126. ISP 2126 in turn provides data communication services through the world wide packet data communication network now commonly referred to as the "Internet" 2128. Local network 2122 and Internet 2128 both use electrical, electromagnetic or optical signals that carry digital data streams. The signals through the various networks and the signals on network link 2120 and through communication interface 2118, which carry the digital data to and from computer system 2100, are exemplary forms of carrier waves transporting the information.

Computer system 2100 can send messages and receive data, including program code, through the network(s), network link 2120 and communication interface 2118. In the Internet example, a server 2130 might transmit a requested code for an application program through Internet 2128, ISP 2126, local network 2122 and communication interface 2118.

The received code may be executed by processor 2104 as it is received, and/or stored in storage device 2110, or other non-volatile storage for later execution. In this manner, computer system 2100 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

The invention claimed is:

1. A machine implemented method, comprising:
   receiving a set of output from a functional component, wherein the set of output is generated dynamically as a result of executing the functional component, and wherein the set of output does not set forth any presentation format for presenting information in the set of output to a user;
   transforming the set of output into a set of generic formatted output, wherein the set of generic formatted output comprises selected information from the set of output, wherein the set of generic formatted output comprises formatting information indicating one or more formats for presenting the selected information to a user, and wherein the set of generic formatted output is not customized for consumption by any particular client;
   determining a particular type of output desired by a first client which can be consumed by the first client to present information to a user, wherein the particular type of output is one of a plurality of possible types of output;
   transforming the set of generic formatted output into a first set of customized formatted output of the particular type of output, wherein the first set of customized formatted output is customized for consumption by the first client for presenting the selected information to a first user; and
   sending the first set of customized formatted output to the first client to enable the first client to present the selected information to the first user.

2. The machine implemented method of claim 1, further comprising:
   determining a certain type of output desired by a second client which can be consumed by the second client to present information to a user, wherein the certain type of output is one of the plurality of possible types of output; and
   transforming the set of generic formatted output into a second set of customized formatted output of the certain type of output, wherein the second set of customized formatted output is customized for consumption by the second client for presenting the selected information to a second user, and wherein the first and second sets of customized formatted outputs are of different output types.

3. The machine implemented method of claim 1, wherein the functional component is a component that implements a command in a command line interface.

4. The machine implemented method of claim 1, wherein a portion of the set of output has a set of one or more required privileges associated therewith, and wherein the machine implemented method further comprises:
   determining whether the first user has the one or more required privileges; and
   in response to a determination that the first user does not have the one or more required privileges, filtering the portion to ensure that the portion is not included in the selected information.

5. The machine implemented method of claim 1, wherein the set of output comprises a message, and wherein transforming the set of output into the set of generic formatted output comprises:
   receiving an indication of a locale; and
   translating the message into a translated message which is in a language that is associated with the locale.

6. The machine implemented method of claim 5, wherein the set of output further comprises a dynamic value, and wherein translating the message comprises:
   inserting the dynamic value into a particular location in the translated message.

7. The machine implemented method of claim 1, wherein transforming the set of output into the set of generic formatted output comprises:
   selecting a particular transformation mechanism that is associated with the functional component; and
   using the particular transformation mechanism to transform the set of output into the set of generic formatted output.

8. The machine implemented method of claim 1, wherein transforming the set of generic formatted output into the first set of customized formatted output comprises:
   selecting a particular transformation mechanism that produces output of the particular type of output; and
   using the particular transformation mechanism to transform the set of generic formatted output into the first set of customized formatted output such that the first set of customized formatted output is of the particular type of output.

9. The machine implemented method of claim 1, wherein the set of output and the set of generic formatted output are expressed in extensible markup language (XML).

10. A non-transitory machine readable storage medium, comprising:
    instructions for causing one or more processors to receive a set of output from a functional component, wherein the set of output is generated dynamically as a result of executing the functional component, and wherein the set of output does not set forth any presentation format for presenting information in the set of output to a user;
    instructions for causing one or more processors to transform the set of output into a set of generic formatted output, wherein the set of generic formatted output comprises selected information from the set of output, wherein the set of generic formatted output comprises formatting information indicating one or more formats for presenting the selected information to a user, and wherein the set of generic formatted output is not customized for consumption by any particular client;

instructions for causing one or more processors to determine a particular type of output desired by a first client which can be consumed by the first client to present information to a user, wherein the particular type of output is one of a plurality of possible types of output;

instructions for causing one or more processors to transform the set of generic formatted output into a first set of customized formatted output of the particular type of output, wherein the first set of customized formatted output is customized for consumption by the first client for presenting the selected information to a first user; and instructions for causing one or more processors to send the first set of customized formatted output to the first client to enable the first client to present the selected information to the first user.

11. The non-transitory machine readable storage medium of claim 10, further comprising:

instructions for causing one or more processors to determine a certain type of output desired by a second client which can be consumed by the second client to present information to a user, wherein the certain type of output is one of the plurality of possible types of output; and instructions for causing one or more processors to transform the set of generic formatted output into a second set of customized formatted output of the certain type of output, wherein the second set of customized formatted output is customized for consumption by the second client for presenting the selected information to a second user, and wherein the first and second sets of customized formatted outputs are of different output types.

12. The non-transitory machine readable storage medium of claim 10, wherein the functional component is a component that implements a command in a command line interface.

13. The non-transitory machine readable storage medium of claim 10, wherein a portion of the set of output has a set of one or more required privileges associated therewith, and wherein the non-transitory machine readable storage medium further comprises:

instructions for causing one or more processors to determine whether the first user has the one or more required privileges; and instructions for causing one or more processors to filter, in response to a determination that the first user does not have the one or more required privileges, the portion to ensure that the portion is not included in the selected information.

14. The non-transitory machine readable storage medium of claim 10, wherein the set of output comprises a message, and wherein the instructions for causing one or more processors to transform the set of output into the set of generic formatted output comprises:

instructions for causing one or more processors to receive an indication of a locale; and instructions for causing one or more processors to translate the message into a translated message which is in a language that is associated with the locale.

15. The non-transitory machine readable storage medium of claim 14, wherein the set of output further comprises a dynamic value, and wherein the instructions for causing one or more processors to translate the message comprises:

instructions for causing one or more processors to insert the dynamic value into a particular location in the translated message.

16. The non-transitory machine readable storage medium of claim 10, wherein the instructions for causing one or more processors to transform the set of output into the set of generic formatted output comprises:

instructions for causing one or more processors to select a particular transformation mechanism that is associated with the functional component; and instructions for causing one or more processors to use the particular transformation mechanism to transform the set of output into the set of generic formatted output.

17. The non-transitory machine readable storage medium of claim 10, wherein the instructions for causing one or more processors to transform the set of generic formatted output into the first set of customized formatted output comprises:

instructions for causing one or more processors to select a particular transformation mechanism that produces output of the particular type of output; and instructions for causing one or more processors to use the particular transformation mechanism to transform the set of generic formatted output into the first set of customized formatted output such that the first set of customized formatted output is of the particular type of output.

18. The non-transitory machine readable storage medium of claim 10, wherein the set of output and the set of generic formatted output are expressed in extensible markup language (XML).

* * * * *